United States Patent
Pei et al.

(10) Patent No.: US 9,075,695 B2
(45) Date of Patent: Jul. 7, 2015

(54) VERSION CONFLICT CHECKING TO INSTALLABLE UNIT

(71) Applicant: International Business Machines Corporation, Armonk, NY (US)

(72) Inventors: Yang Pei, Beijing (CN); Zhen Zhang, Beijing (CN); Zhu Bin, Beijing (CN); Zhao Bing Han, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 13/776,918

(22) Filed: Feb. 26, 2013

(65) Prior Publication Data

US 2013/0227542 A1    Aug. 29, 2013

(30) Foreign Application Priority Data

Feb. 28, 2012   (CN) .......................... 2012 1 0048760

(51) Int. Cl.
*G06F 9/44*    (2006.01)
*G06F 9/445*   (2006.01)

(52) U.S. Cl.
CPC .. *G06F 8/71* (2013.01); *G06F 8/65* (2013.01); *G06F 8/61* (2013.01); *G06F 8/68* (2013.01)

(58) Field of Classification Search
None
See application file for complete search history.

(56) References Cited

U.S. PATENT DOCUMENTS

| | | | |
|---|---|---|---|
| 6,442,753 B1 | 8/2002 | Gerard et al. | |
| 6,442,754 B1 | 8/2002 | Curtis | |
| 7,174,540 B2 | 2/2007 | Ondrusek et al. | |
| 7,415,706 B1 * | 8/2008 | Raju et al. | 717/170 |
| 7,506,336 B1 | 3/2009 | Ninan | |
| 7,512,929 B2 | 3/2009 | Sangal et al. | |
| 7,984,436 B1 * | 7/2011 | Murray | 717/175 |
| 2003/0159135 A1 * | 8/2003 | Hiller et al. | 717/166 |
| 2004/0168152 A1 | 8/2004 | Kramer | |
| 2004/0199551 A1 * | 10/2004 | Gits et al. | 707/203 |
| 2004/0255272 A1 | 12/2004 | Ondrusek et al. | |

(Continued)

FOREIGN PATENT DOCUMENTS

| | | |
|---|---|---|
| CN | 101324900 A | 12/2008 |
| CN | 101984410 A | 3/2011 |

OTHER PUBLICATIONS

Sangal et al., "Using Dependency Models to Manage Complex Software Architecture," OOPSLA 05, Oct. 16-20, 2005, San Diego, CA, 10 pages.

(Continued)

*Primary Examiner* — Lewis A Bullock, Jr.
*Assistant Examiner* — Tina Huynh
(74) *Attorney, Agent, or Firm* — Cantor Colburn LLP; Rahan Uddin

(57) ABSTRACT

According to an aspect of the present invention, there is provided a method, system, and computer program product for version conflict checking of installable units (IUs). The method includes receiving a request for version conflict checking of specified IU, the request including a version dependency relationship between IUs that are in a dependency relationship with the specified IU. A version dependency relationship between installed IUs is obtained. The version dependency relationship between the installed IUs is updated according to the version dependency relationships between the IUs that are in a dependency relationship with the specified IU. It is checked whether the specified IU has a version conflict with the updated version dependency relationship between the installed IUs.

18 Claims, 3 Drawing Sheets

(56) References Cited

U.S. PATENT DOCUMENTS

| | | | |
|---|---|---|---|
| 2004/0255291 A1* | 12/2004 | Sierer et al. | 717/174 |
| 2006/0031827 A1 | 2/2006 | Barfield et al. | |
| 2006/0047512 A1 | 3/2006 | Yuan et al. | |
| 2007/0006222 A1* | 1/2007 | Maier et al. | 717/174 |
| 2008/0059782 A1* | 3/2008 | Kruse et al. | 713/1 |
| 2008/0155494 A1* | 6/2008 | Gobel | 717/104 |
| 2009/0064121 A1* | 3/2009 | Archambault et al. | 717/161 |
| 2009/0150408 A1* | 6/2009 | Birkenfeld et al. | 707/10 |
| 2011/0066661 A1 | 3/2011 | Sangal et al. | |
| 2012/0054731 A1* | 3/2012 | Aravamudan et al. | 717/170 |

OTHER PUBLICATIONS

Ma et al., The Design of Dependency Relationships Matrix to Improve the testability of Component-based Software, ACM Digital Library, IEEE Computer Society, Washington, DC, 2006, 2 pages.

\* cited by examiner

VERSION CONFLICT CHECKING TO INSTALLABLE UNIT

PRIORITY

This application claims priority to Chinese Patent Application No. 201210048760.0, filed 28 Feb. 2012, and all the benefits accruing therefrom under 35 U.S.C. §119, the contents of which in its entirety are herein incorporated by reference.

BACKGROUND

The present invention relates to software version conflict checking, and more specifically, to version conflict checking of an installable unit.

At present, information technology (IT) companies often need to provide comprehensive solutions for their customers. In such a comprehensive solution, IT companies often have to deploy for their customers a complex IT environment, where fundamental software needs to work together with business integration software or with different components belonging to different versions of the same software. During the installation, if newly installed software is not aware of its dependencies on other software versions in the IT environment, then the installation might fail; or after being installed, the newly installed software does not operate normally; or the installation results in other software in the IT environment not operating normally. No matter which circumstance occurs, the software maintenance cost will be increased. This is not desired by IT companies. Therefore, version level dependency relationship checks to different software and components in a life cycle of one system becomes more and more important.

Currently, software version dependency relationship checking is typically implemented using static methods, and developers need to manually record and maintain dependency information between software, for example, by recording version dependency information between software using configuration files. During software installation or updating, an installer checks, manually by a programmer or automatically, whether the dependency relationship between to-be-installed or to-be-updated software and other software in the current IT environment is compatible, so as to determine whether to install or update the current software. While uninstalling software, it is quite difficult to check whether the software to be uninstalled will exert an impact on installed software in the current system and which software will be affected.

SUMMARY

According to an aspect of the present invention, there is provided a method, system, and computer program product for version conflict checking of installable units (IUs). The method includes receiving a request for version conflict checking of specified IU, the request including a version dependency relationship between IUs that are in a dependency relationship with the specified IU. A version dependency relationship between installed IUs is obtained. The version dependency relationship between the installed IUs is updated according to the version dependency relationships between the IUs that are in a dependency relationship with the specified IU. It is checked whether the specified IU has a version conflict with the updated version dependency relationship between the installed IUs.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Referring to the figures, embodiments of the present disclosure will be described in more detail. Although the figures depict embodiments of the present disclosure, it should be understood that the present disclosure may be implemented in various manners and is not to be limited by the embodiments disclosed here. On the contrary, these embodiments are provided to make the present disclosure more thorough and complete and to completely convey the scope of the present disclosure to one skilled in the art.

Currently, software systems are becoming more complex and are changing at an increasing speed. Contemporary software installation and update checking can no more meet the considerable demand changes. In addition, at the beginning of software design, version dependency relationship between software is quite simple, and only the version itself is focused on. If the software has a more complex dependency relationship with other software or components in the future, it may require extensive complex modifications to software code.

Embodiments provide version conflict checking of an installable unit, which can check whether a dependency relationship between to-be-installed/to-be-updated/to-be-uninstalled software and other software versions in an environment is proper or not, so as to determine whether or not it is proper to install/update/uninstall the software in the environment.

Figure 1:
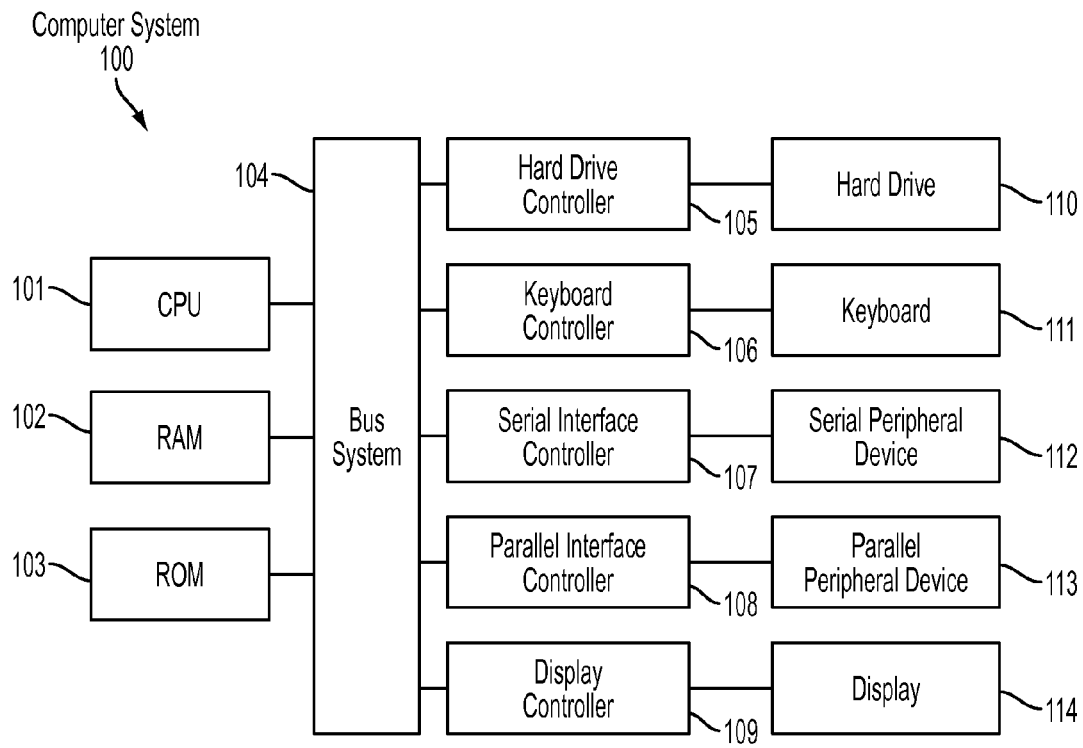
FIG. 1 illustrates a block diagram of an exemplary computer system which is applicable to implement the embodiments of the present invention.

FIG. 1 illustrates a block diagram of an embodiment of an exemplary computer system 100 which is applicable to implement embodiments of the present invention. As illustrated in FIG. 1, the computer system 100 may include: central processing unit (CPU) 101, random access memory (RAM) 102, read only memory (ROM) 103, system bus 104, hard drive controller 105, keyboard controller 106, serial interface controller 107, parallel interface controller 108, display controller 109, hard drive 110, keyboard 111, serial peripheral equipment 112, parallel peripheral equipment 113 and display 114. Among the above devices, CPU 101, RAM 102, ROM 103, hard drive controller 105, keyboard controller 106, serial interface controller 107, parallel interface controller 108 and display controller 109 are coupled to the system bus 104. Hard drive 110 is coupled to hard drive controller 105. Keyboard 111 is coupled to keyboard controller 106.

Serial peripheral equipment 112 is coupled to serial interface controller 107. Parallel peripheral equipment 113 is coupled to parallel interface controller 108, and display 114 is coupled to display controller 109. It should be understood that the structure as illustrated in FIG. 1 is only for the exemplary purpose rather than any limitation to embodiments of the present invention. In some embodiments, devices may be added into or removed from the computer system 100 based on specific situations.

As will be appreciated by one skilled in the art, embodiments of the present invention may be embodied as a system, method or computer program product. Accordingly, the present disclosure may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, in some embodiments, the embodiments of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, module, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of embodiments of the present invention may be written in one or more programming languages or any combination thereof, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing modules, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In embodiments of the present invention, records of a version dependency relationship between software may be formally represented by a version dependency matrix. Data formats recorded by the version dependency matrix may take various forms, such as, but not limited to being stored in a certain file format (XML, properties, JSON, text, etc.), a data structure of a program, or stored in database table records.

The version dependency matrix is a square or rectangular matrix. Table 1 illustrates an embodiment of a version dependency matrix. The first row and the first column of the version dependency matrix represent a group of sequential installable units (IUs). An IU is a group of installable files that have the same version and dependency relationship, and it can be software, a component in software, a group of integrated software programs, hardware, an operating system, and/or an operating system-level component. The IUs in the first row of the version dependency matrix are arranged in the same order as those in the first column; that is, IU1-IU4 in the first row in Table 1 refer to 4 IUs, and IU1-IU4 in the first column refer to the 4 IUs in the first row.

TABLE 1

Example of Version Dependency Matrix

|     | IU1        | IU2 | IU3      | IU4             |
| --- | ---------- | --- | -------- | --------------- |
| IU1 | 1.1        | 1.2 | 1.1, 1.2 | 1.1, [1.4, 1.7] |
| IU2 | (1.0, 1.2] | 1.2 | −1       | (1.0, 1.5]      |

TABLE 1-continued

Example of Version Dependency Matrix

|     | IU1         | IU2      | IU3 | IU4 |
|-----|-------------|----------|-----|-----|
| IU3 | 0, 1.0, 1.3 | −1       |     | 0   |
| IU4 |             | 1.2, 2.0 |     |     |

Cell representation in the version dependency matrix.

A value of a diagonal element (excluding elements in the first row and the first column) of the version dependency matrix represents an installation status of the IU, e.g., 1.1, 1.2, 0, and blank in Table 1. In an embodiment, there are 3 installation statuses according to values: i) Not Installed, which indicates the IU is not installed and which is represented by 0, for example, IU3 in Table 1 is not installed; ii) Installed or Contained, which indicates the IU is installed in a certain installed IU set or contained in a certain to-be-installed IU set and its version is known, e.g., representing its 1.1 version by a version representation method, for example, an installed version of the installable unit IU1 in Table 1 is 1.1 and an installed version of the installable unit IU2 is 1.2; iii) Not Contained, which indicates that the IU is not contained in an IU set (i.e., a set formed by IU1-IU4 in Table 1) using the version dependency matrix, for example, the installable unit IU4 in Table 1 is not contained in the IU set. The status "Not Contained" can only appear in a to-be-installed IU set and should not appear in an installed IU set. For example, an installed IU set comprises several components in an installed operating system, and a patch package (containing several components) of the operating system are a to-be-installed IU set. The status of some IUs may appear "Not Contained" in a version dependency matrix of the patch package, because as a matter of fact, many components contained by the patch package depend on components that are not contained in the patch package, and the version dependency matrix merely records a dependency relationship between them.

An element [IUn, IUc] in row n and column c of the version dependency matrix represents a dependency relationship value of the IU in row n and column 1 on the IU in row 1 and column c, wherein n and c each are an integer greater than 1, and n is not equal to c. A range type of the element [IUn, IUc] comprises at least one of enumeration, range, mutex, and no dependency relationship. Hereinafter, these range types will be introduced in turn:

Enumeration: enumerate version value(s) of one or more dependencies, the value may be a Not Installed status value or a range value but should not be a mutex value. For example, in Table 1, a version dependency of the IU1 on IU3 is 1.1, 1.2, representing the dependency of IU1 on the IU3 is that the IU3 is to be installed with a 1.1 or 1.2 version; a version dependency of the IU3 on the IU1 is 0, 1.0, 1.3, representing the dependency of IU3 on the IU1 is that the IU1 either is not installed or is to be installed with a 1.0 or 1.3 version.

Range: enumerate a range of version values of a dependency, where a value can only be a version value and a range-type relationship value may be used in connection with an enumeration-type relationship value. For example, in Table 1, a version dependency of the IU1 on IU4 is 1.1, [1.4, 1.7], representing the dependency of the IU1 on the IU4 is that the IU4 is to be installed with a 1.1 version or a version between 1.4 and 1.7.

Mutex: represent that 2 IUs do not co-exist or are incompatible. If a dependency relationship between 2 IUs is mutex, a status of one of the 2 IUs must be Not Installed and is represented by −1, e.g., the dependency between the IU2 and the IU3 in Table 1.

No dependency relationship: represent there is no dependency relationship between 2 IUs, such as blank, e.g., the dependency between the IU4 and the IU3 in Table 1.

The above dependency relationship range types represented by values are all schematic, and one skilled in the art may appreciate that the above dependency relationship range types may be represented using any other values.

TABLE 2

Special Form of Version Dependency Matrix Existence

|     | IU1         | IU2  | IU3      | IU4          |
|-----|-------------|------|----------|--------------|
| IU1 | 1.1         | 1.2  | 1.1, 1.2 | 1.1, [1.4, 1.7] |
| IU2 | (1.0, 1.2]  | 1.2  | −1       | (1.0, 1.5]   |
| IU3 | 0, 1.0, 1.3 | −1   | 0        |              |

TABLE 3

Version Dependency Matrix Equivalent to Table 2

|     | IU1         | IU2  | IU3      | IU4          |
|-----|-------------|------|----------|--------------|
| IU1 | 1.1         | 1.2  | 1.1, 1.2 | 1.1, [1.4, 1.7] |
| IU2 | (1.0, 1.2]  | 1.2  | −1       | (1.0, 1.5]   |
| IU3 | 0, 1.0, 1.3 | −1   | 0        |              |
| IU4 |             |      |          |              |

Table 2 is an embodiment of a special form of version dependency matrix existence, namely a rectangle. In fact, this form is equivalent to canceling some rows or columns of a square form, and cell values of these cancelled rows or columns are all blank. Table 3 is an embodiment of a version dependency matrix equivalent to Table 2. While checking whether a version conflict exists in a subsequent dependency relationship of the version, this rectangle may be transformed to the matrix as illustrated in Table 3, prior to updating and checking.

Figure 2:
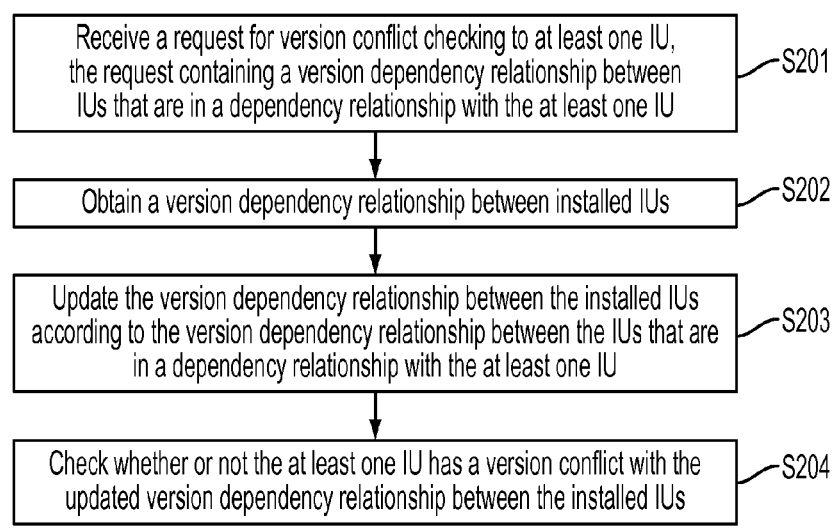
FIG. 2 illustrates a flow of a method for version conflict checking of an installable unit (IU) in accordance with an embodiment.

By means of the above-defined version dependency relationship, it is possible to check whether or not a version conflict exists in a dependency relationship of at least one specified to-be-installed/to-be-updated/to-be-uninstalled IU between other installed IU versions. FIG. 2 illustrates a flow of a method for version conflict checking of an IU in accordance with an embodiment. According to FIG. 2, the method includes: in step S201, receiving a request for version conflict checking of at least one specified IU, the request containing a version dependency relationship between IUs that are in a dependency relationship with the at least one specified IU; in step S202, obtaining a version dependency relationship between installed IUs; in step S203, updating the version dependency relationship between the installed IUs according to the version dependency relationship between the IUs that are in a dependency relationship with the at least one specified IU; and in step S204, checking whether or not the at least one specified IU has a version conflict with the updated version dependency relationship between the installed IUs.

The method for version conflict checking of embodiments may be applied to at least one scenario of: clean installation, i.e., installing a new IU, that is, the new IU does not exist in the version dependency relationship between the installed IUs that has not been updated; updating installation, i.e., installing another version of an old IU, where a version other than the another old IU version exists in the version dependency relationship between the installed IUs that has not been updated; and uninstallation, i.e., uninstalling an installed IU, where this installed IU already exists in the version dependency relationship between the installed IUs.

The version dependency relationship in the embodiments of the present invention may use the above version dependency matrix. Specifically, in method implementations and computer program design, the matrix may be described using any proper data structure, such as a two-dimensional array, a plurality of one-dimensional arrays, a table, and even a database table or an XML file, etc. It falls within the protection scope of embodiments of the present invention so long as the version dependency relationship between IUs as represented by the above version dependency matrix can be described.

The version dependency matrix of the IUs that are in a dependency relationship with the at least one specified IU may be provided by a program in any of the above data formats; initially, the version dependency relationship between the installed IUs may be blank in an system, and with the increase of installed IUs, the version dependency relationship between the installed IUs is gradually updated using step S203. After an installed IU is cancelled, the version dependency relationship between the installed IUs is also gradually updated using step S203. By checking whether a version conflict exists in the updated version dependency relationship between the installed IUs, personnel who are installing/updating/canceling software are given a prompt indicating whether or not their operations will cause problems to the existing system, so as to remind them whether their operations may be performed or not.

A concrete updating procedure of step S203 of the above method may be explained by way of example. Updating a version dependency matrix refers to updating a version dependency matrix between the installed IUs with a version dependency matrix between the IUs that are in a dependency relationship with the at least one specified IU. Here the version dependency matrix between the installed IUs is called a maternal matrix.

The updating procedure includes: the version dependency matrix between the IUs that are in a dependency relationship with the at least one specified IU may include clean installation, updating installation and uninstallation separately, or may include mixed operations of clean installation, updating installation and uninstallation.

Figure 3:
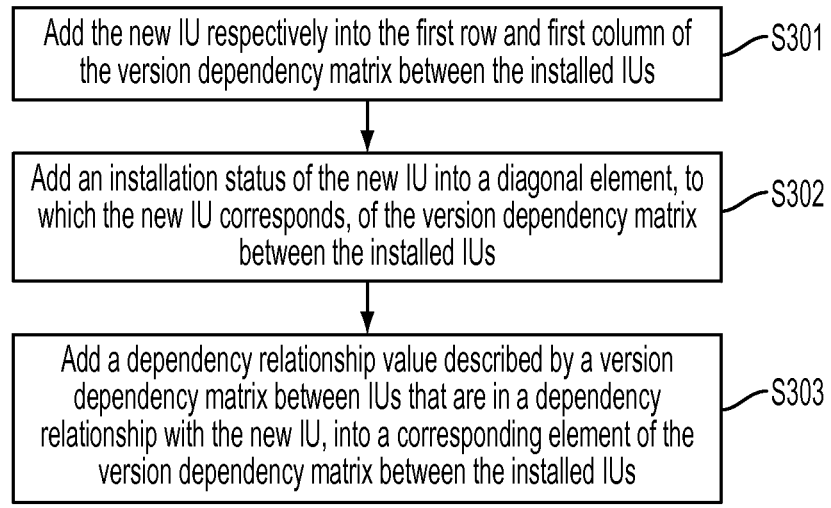
FIG. 3 illustrates a flow of updating a maternal matrix of a clean-installable IU in accordance with an embodiment.

FIG. 3 illustrates a flow of updating a maternal matrix of a clean-installable IU in accordance with an embodiment. According to FIG. 3, in step S301, the new IU is respectively added into the first row and first column of the version dependency matrix between the installed IUs; the new IU may be added by supplementing one row and one column, either in the last row and last column or in the middle row and middle column, provided that the arrangement order of all IUs after the addition is ensured to be the same; in step S302, an installation status of the new IU is added into a diagonal element, to which the new IU corresponds, of the version dependency matrix between the installed IUs; and in step S303, adding a dependency relationship value described by the version dependency matrix between the IUs that are in a dependency relationship with the new IU, into a corresponding element of the version dependency matrix between the installed IUs.

A concrete example of the above steps is presented below. Table 4 presents a version dependency matrix between installed IUs in accordance with an embodiment, namely a maternal matrix, wherein two IUs, IU1 and IU2, are included. Table 5 presents a version dependency matrix between IUs that are in a dependency relationship with at least one specified IU in accordance with an embodiment, the matrix containing a new installable unit IU3, wherein [IU3, IU3]=1.0 represents that a to-be-installed version of the IU3 is 1.0, [IU3, IU2]=[1.0, 2.0] represents that a dependency of IU3 on IU2 is any one of 1.0 to 2.0, and IU2 is not contained in the updating and has no dependency requirement on IU3.

TABLE 4

Version Dependency Matrix Between Installed IUs

|     | IU1 | IU2      |
| --- | --- | -------- |
| IU1 | 1.1 | 1.2, 1.3 |
| IU2 |     | 1.2      |

TABLE 5

Version Dependency Matrix Between IUs on Which an IU Is Dependent

|     | IU3 | IU2        |
| --- | --- | ---------- |
| IU3 | 1.0 | [1.0, 2.0] |
| IU2 |     |            |

In the course of performing step S303, first a row and column of the IU3 are supplemented to the maternal matrix of Table 4, e.g., supplemented at the last row; then, element values in the matrix of Table 5 are updated to corresponding cells in the matrix of Table 4, whereby a new maternal matrix is obtained as illustrated in Table 6. Finally, the updating procedure is completed.

TABLE 6

Updated Maternal Matrix

|     | IU1 | IU2        | IU3 |
| --- | --- | ---------- | --- |
| IU1 | 1.1 | 1.2, 1.3   |     |
| IU2 |     | 1.2        |     |
| IU3 |     | [1.0, 2.0] | 1.0 |

Figure 4:
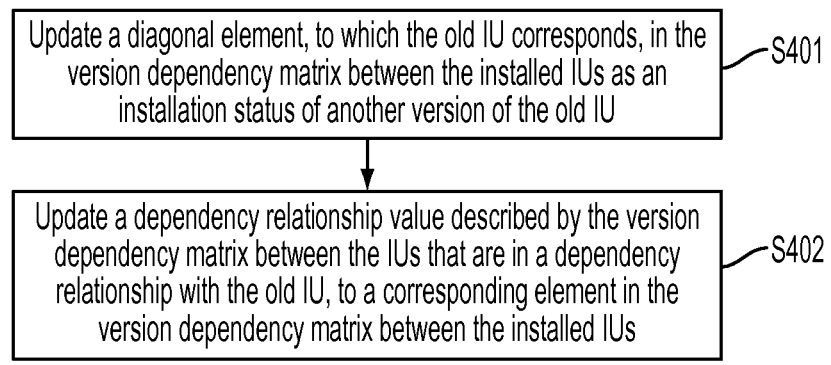
FIG. 4 illustrates a flow of updating a maternal matrix of an update-installable IU in accordance with an embodiment.

FIG. 4 illustrates a flow of updating a maternal matrix of an update-installable IU in accordance with an embodiment. According to FIG. 4, in step S401, a diagonal element, to which an old IU corresponds, in the version dependency matrix of the installed IUs is updated with installation status of another version of the old IU; in step S402, a corresponding element in the version dependency matrix between the installed IUs is updated with a dependency relationship value described by the version dependency matrix between the IUs that are in a dependency relationship with the old IU. The updating is implemented as below: finding a corresponding dependency relationship value in the maternal matrix, and then replacing the dependency relationship value in the maternal matrix with a dependency relationship value in the version dependency matrix between the IUs that are in a dependency relationship with the at least one specified IU. However, if the dependency relationship value in the version dependency matrix between the IUs that are in a dependency relationship with the at least one specified IU is Not Contained, then the corresponding dependency relationship value in the maternal matrix is updated to Not Installed (refer to the definition of Not Contained).

TABLE 7

Version Dependency Matrix Between IUs on
Which a To-Be-Updated IU Is Dependent

|  | IU2 |
|---|---|
| IU2 | 1.3 |

A concrete example of the above steps is presented below. For example, a version of the installable unit IU2 in the matrix of Table 4 is to be updated. Table 7 illustrates a version dependency relationship matrix between IUs that are in a dependency relationship with the to-be-updated IU, where [IU2, IU2]=1.3 represents that a to-be-installed version of the IU2 is 1.3. However, a version of the IU2 in the maternal matrix is 1.2, at which point an updating procedure is represented. The matrix of Table 7 is updated into a corresponding cell in the maternal matrix of Table 4, whereby a maternal matrix of Table 8 is obtained.

TABLE 8

Updated Maternal Matrix

|  | IU1 | IU2 |
|---|---|---|
| IU1 | 1.1 | 1.2, 1.3 |
| IU2 |  | 1.3 |

Updating operations include a version upgrade and a version rollback. A rollback means a version downgrade of an IU, and the low version has once been installed and used. In particular, other problems are detected on software that was newly updated to a higher version, and it is necessary to roll back the software to the old-version. For this special case, there is an embodiment in which a version dependency matrix that passed a check successfully is stored and used during a rollback. Specifically, first in response to having checked that the at least one specified IU has no version conflict with the updated version dependency relationship between the installed IUs, an updating sequence and the version dependency relationship between the installed IUs that is updated each time are stored; then in response to installing another version of the old IU, the updating the version dependency relationship between the installed IUs according to the version dependency relationship between the IUs that are in a dependency relationship with the at least one specified IU includes: obtaining, from the stored version dependency relationship between the installed IUs, a version dependency relationship between the installed IUs that contains the old IU and that has the latest updating sequence, as a version dependency matrix between IUs that are in a dependency relationship with the old IU. In this manner, it is possible to use the updating flow of the above update-installable unit. The updating sequence may be expressed in various forms, such as using an updated date, a simple sequence number indicating the precedence of updating, etc.

While uninstalling the old IU, the updating the version dependency relationship between the installed IUs includes: updating a diagonal element, to which the old IU corresponds, in the version dependency matrix between the installed IUs to an installation status of Not Installed. For example, regarding uninstalling the installable unit IU2 by using the matrix illustrated in Table 4, Table 9 illustrates an embodiment of a version dependency matrix between IUs that are in a dependency relationship with a to-be-updated IU, wherein [IU2, IU2]=0 represents that the IU2 is not installed. However, a version of the IU2 in the maternal matrix of Table 4 is 1.2, at which point the IU2 will be uninstalled. After updating, a maternal matrix as illustrated in the embodiment shown in Table 10 is obtained. Subsequent dependency relationship checking will find that the IU2 here should not be uninstalled, because the IU1 is dependent on the IU2.

TABLE 9

Version Dependency Matrix Between IUs That are in
a Dependency Relationship with a To-Be-Updated IU

|  | IU2 |
|---|---|
| IU2 | 0 |

TABLE 10

Maternal Matrix

|  | IU1 | IU2 |
|---|---|---|
| IU1 | 1.1 | 1.2, 1.3 |
| IU2 |  | 0 |

One check may be made by one mixed operation (including one or more of the three operations: installation, updating and uninstallation). During concrete implementation, an updating step used during installation, updating and uninstallation may be executed respectively. In an embodiment, first the updating step for an uninstalling procedure to the version dependency matrix between the installed IUs is implemented, and then the updating step for an installing or updating procedure to the version dependency matrix between the installed IUs is implemented. In this manner, the workload for updating the version dependency matrix between the installed IUs is reduced.

Figure 5:
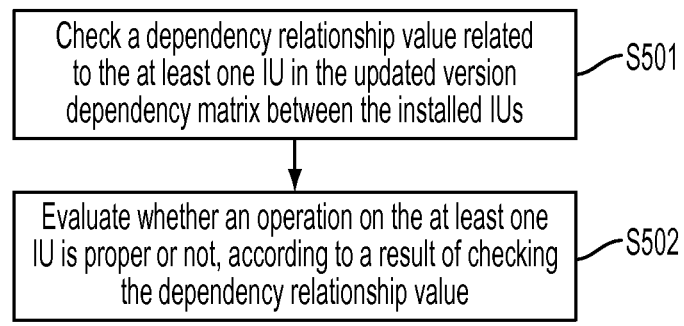
FIG. 5 illustrates steps of a checking method in accordance with an embodiment.

In step S204, it is checked whether or not the at least one specified IU has a version conflict with the updated version dependency relationship between the installed IUs. Checking the updated version dependency matrix serves a purpose of checking whether or not a version dependency relationship between respective IUs is still established in the updated maternal matrix, and whether or not it is possible to output a check result for an installation/updating/uninstallation operation on each IU in the updated maternal matrix. The embodiment shown in FIG. 5 illustrates steps of a checking method in accordance with an embodiment. According to FIG. 5, the method includes: in step S501, checking a dependency relationship value, which is related to the at least one specified IU, in the updated version dependency matrix between the installed IUs; and in step S502, evaluating whether an operation on the at least one specified IU is proper or not, according to a result of checking the dependency relationship value.

In an embodiment, the checking a dependency relationship value of an IU with other IUs that are in a dependency relationship may adopt the following approach: suppose a dependency relationship value in the updated version dependency matrix between the installed IUs [IUn, IUc], wherein IUn represents a certain other installable unit, IUc represents a being-checked installed unit, and [IUn, IUc] represents a dependency relationship of the other IU with the being-checked IU. For an installable unit, a dependency relationship value may be checked in an embodiment using the following rules:

(1) If a range type of [IUn, IUc] is no dependency, a checking result for [IUn, IUc] is no version conflict;

(2) If a range type of [IUn, IUc] is mutex, it is checked whether a range type of [IUc, IUn] is mutex or not, and it is checked that a range type of at least one of [IUc, IUc] and [IUn, IUn] is not installed; if both are established, a checking result for [IUn, IUc] is no version conflict; or else a version conflict;

(3) If a range type of [IUn, IUc] is enumeration or range, it is checked whether or not a value of [IUc, IUc] is within a range of each value of [IUn, IUc]; if yes, a checking result for [IUn, IUc] is no version conflict; or else a version conflict.

In one embodiment, for each IU in the updated version dependency matrix, dependency relationship values in a column where the IU is located are obtained and checked in sequence; upon completion of checking, a checking result for all dependency relationship values of the IU is obtained, and subsequently analysis is made as to whether an operation on the IU, e.g., installation, updating or uninstallation, will cause a problem or not. Next, other IUs are checked in sequence.

An example of checking according to the above embodiment is presented below. Table 11 illustrates an embodiment of a resulted version dependency matrix between installed IUs after an updating which requires installing the IU3, updating the IU4 and uninstalling the IU1. It is required to check whether the above actions of installing the IU3, updating the IU4 and uninstalling the IU1 are feasible or not.

While checking the IU3, a column where the IU3 is located in the maternal matrix of Table 11 is found, and then [IU1, IU3], [IU2, IU3], and [IU4, IU3] are checked respectively, which results in "no conflict, conflict, no conflict" respectively. A concrete checking procedure is as below: [IU1, IU3] is blank, representing the IU1 has no dependency on the IU3, so the check results in no conflict. [IU2, IU3] is mutex, so [IU3, IU2] is checked at the same time; if [IU3, IU2] is also mutex, [IU3, IU3] and [IU2, IU2] are checked, which results in that neither of them is in Not Installed status; hence, the mutex is not established, and the check results in a conflict. [IU4, IU3] is blank, representing the IU4 has no dependency on the IU3, so the check results in no conflict.

While checking the IU4, first a column where the IU4 is located in the maternal matrix of Table 11 is found, and then [IU1, IU4], [IU2, IU4], and [IU3, IU4] are checked respectively, which results in "no conflict, no conflict, no conflict" respectively. A concrete checking procedure is as below: [IU1, IU4] is blank, representing the IU1 has no dependency on the IU4, so the check result is no conflict. [IU2, IU4] is enumeration dependency 0, 1.3, 1.5, so it is checked whether or not [IU4, IU4]=1.3 falls within this range of enumeration values, and the check results in no conflict. [IU3, IU4] is enumeration dependency 1.2, 1.3, so it is checked whether or not [IU4, IU4]=1.3 falls within this range of enumeration values; if not, the check results in no conflict.

While checking the IU1, first a column where the IU1 is located in the maternal matrix of Table 11 is found, and then [IU2, IU1], [IU3, IU1], and [IU4, IU1] are checked respectively, which results in "no conflict, no conflict, conflict" respectively. A concrete checking procedure is as below: [IU2, IU1] is blank, representing the IU2 has no dependency on the IU1, so the check results in no conflict. [IU3, IU1] is blank, representing the IU3 has no dependency on the IU1, so the check results in no conflict. [IU4, IU1] is enumeration dependency 1.0, so it is checked whether or not [IU1, IU1]=0 falls within this range of enumeration values; since the IU1 is uninstalled and in Not Installed status, the check results in a conflict.

TABLE 11

Resulted Version Dependency Matrix Between Installed IUs after an Updating Requiring Installing IU3, Updating IU4 and Uninstalling IU1

|     | IU1 | IU2        | IU3 | IU4          |
|-----|-----|------------|-----|--------------|
| IU1 | 0   | [1.0, 1.3] |     |              |
| IU2 |     | 1.1        | −1  | 0, 1.3, 1.5  |
| IU3 |     | −1         | 1.0 | 1.2, 1.3     |
| IU4 | 1.0 | (1.0, 1.4] |     | 1.3          |

The above checking results indicate that installing the IU3 is not feasible, updating the IU4 is feasible and uninstalling the IU1 is not feasible.

In another embodiment, for each installable unit in the updated maternal dependency matrix, it is possible to obtain dependency relationship values in a row where the installable unit is located, and then conduct a check using the same method as for a column.

Even, a check may start from any dependency relationship value in the updated maternal matrix, and finally a checking result for a to-be-checked installable unit is found from checking results of all dependency relationship values and an analysis result is outputted.

Figure 6:
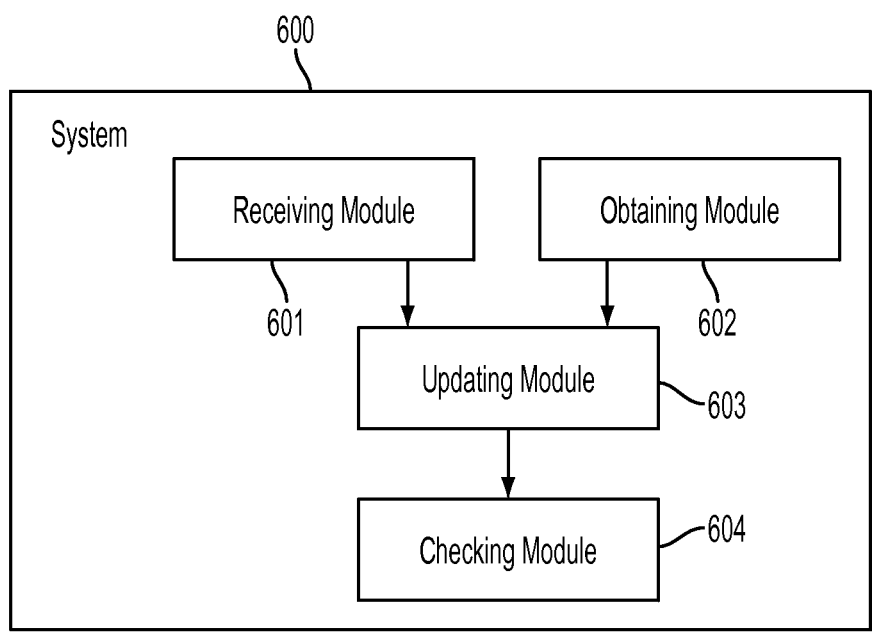
FIG. 6 illustrates a structural block diagram of a system for version conflict checking of an IU.

An embodiment further includes a system for version conflict checking to an installable unit IU. FIG. 6 schematically illustrates a structural block diagram of a system 600 for version conflict checking to an installable unit IU in accordance with an embodiment. According to FIG. 6, the system 600 includes: a receiving module 601 configured to receive a request for version conflict checking to at least one specified IU, the request containing a version dependency relationship between IUs that are in a dependency relationship with the at least one specified IU; an obtaining module 602 configured to obtain a version dependency relationship between installed IUs; an updating module 603 configured to update the version dependency relationship between the installed IUs according to the version dependency relationship between the IUs that are in a dependency relationship with the at least one specified IU; and a checking module 604 configured to check whether or not the at least one IU has a version conflict with the updated version dependency relationship between the installed IUs.

In the system 600, a version dependency relationship may be represented using a version dependency matrix, where each of the first row and first column of the version dependency matrix represents a group of sequential IUs, and IUs in the first row are arranged in the same order as IUs in the first column. Except for elements in the first row and first column, a diagonal element of the version dependency matrix represents an installation status of an IU in this row or column; an element [IUn, IUc] in row n and column c of the version dependency matrix represents a dependency relationship value of an IU in the $n^{th}$ row and the $1^{st}$ column on an IU in the $1^{st}$ row and the $c^{th}$ column, wherein each of n and c is an integer greater than 1 and n is not equal to c. Range types of the element [IUn, IUc] comprise at least one of enumeration, range, mutex and no dependency relationship. A version dependency matrix may be represented by a proper data structure, including a one-dimensional or multi-dimensional array, a table, a database table, etc.

The system 600 applies at least one of the following operations to the at least one IU: I) installing a new IU, wherein the new IU does not exist in the version dependency relationship between the installed IUs that has not been updated; II) installing another version of an old IU, wherein a version of the old IU, other than the another version, exists in the version dependency relationship between the installed IUs that has not been updated; III) uninstalling an installed IU, wherein the installed IU already exists in the version dependency relationship between the installed IUs that has not been updated. In other words, the system 600 may apply a checking to different operations simultaneously, the operations are implemented based on an amount of software, e.g., installing 3 software modules, updating 2 software modules and canceling 5 software modules in this order.

In one embodiment, in response to installing a new IU, operations performed by the updating module comprise: adding the new IU respectively into the first row and first column of the version dependency matrix between the installed IUs; adding an installation status of the new IU into a diagonal element, to which the new IU corresponds, of the version dependency matrix between the installed IUs; and adding a dependency relationship value described by a version dependency matrix between IUs that are in a dependency relationship with the new IU, into a corresponding element of the version dependency matrix between the installed IUs.

In another embodiment, the system 600 further comprises a storage module (not illustrated in FIG. 6) configured to store, in response to having checked that the at least one IU has no version conflict with the updated version dependency relationship between the installed IUs, a version dependency relationship between the installed IUs after each update and an updating sequence; as such, in response to installing another version of the old IU, the operations performed by the updating module further comprise: obtaining, from the stored version dependency relationship between the installed IUs, a version dependency relationship between the installed IUs that contains the old IU and that has the latest updating sequence, as a version dependency matrix between IUs that are in a dependency relationship with the old IU. Such storage is relatively significant to software version updating. Hence, while installing another version of the old IU, the operations performed by the updating module comprise: updating a diagonal element, to which the old IU corresponds, in the version dependency matrix between the installed IUs as an installation status of another version of the old IU; and updating a dependency relationship value described by the version dependency matrix between the IUs that are in a dependency relationship with the old IU, to a corresponding element in the version dependency matrix between the installed IUs.

In a further embodiment, while the system 600 is uninstalling the old IU, the operations performed by the updating module comprise: updating the diagonal element, to which the old IU corresponds, in the version dependency matrix between the installed IUs as an installation status of Not Installed.

After an updated version dependency relationship between installed IUs is obtained, a checking approach remains the same, regardless of installing new software, updating existing software's version or uninstalling software. Operations performed by the checking module 604 comprise: checking a dependency relationship value related to the at least one IU in the updated version dependency matrix between the installed IUs; and evaluating whether an operation on the at least one IU is proper or not, according to a result of checking the dependency relationship value. The checking a dependency relationship value is implemented using rules as below:

(1) If a range type of [IUn, IUc] is no dependency, a checking result for [IUn, IUc] is no version conflict;

(2) If a range type of [IUn, IUc] is mutex, it is checked whether a range type of [IUc, IUn] is mutex or not, and it is checked that a range type of at least one of [IUc, IUc] and [IUn, IUn] is not installed; if both are established, a checking result for [IUn, IUc] is no version conflict; or else a version conflict;

(3) If a range type of [IUn, IUc] is enumeration or range, it is checked whether or not a value of [IUc, IUc] is within a range of each value of [IUn, IUc]; if yes, a checking result for [IUn, IUc] is no version conflict; or else a version conflict.

An embodiment further includes a computer program product for, when being run in a computer, executing the above method.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the respective embodiments of the present invention have been described above, the foregoing illustrations are exemplary and not intended to be exhaustive or to limit the invention to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for version conflict checking of installable units (IUs), the method comprising:
   receiving, by a processor, a request for version conflict checking of a specified IU, the request comprising a version dependency relationship between IUs that are in a dependency relationship with the specified IU;
   obtaining the version dependency relationship between installed IUs, the version dependency relationship represented using a version dependency matrix, wherein:
      each of a first row and a first column of the version dependency matrix represents a group of sequential IUs, and IUs in the first row are arranged in the same order as IUs in the first column;
      except for elements in the first row and first column, a diagonal element of the version dependency matrix represents an installation status of an IU in this row or column; and
      an element [IUn, IUc] in row n and column c of the version dependency matrix represents a dependency relationship value of an IU in the nth row and the 1st column on an IU in the 1st row and the cth column, wherein each of n and c is an integer greater than 1 and n is not equal to c;

updating the version dependency relationship between the installed IUs based on the version dependency relationship between the IUs that are in the dependency relationship with the specified IU; and checking whether the specified IU has a version conflict with the updated version dependency relationship between the installed IUs.

2. The method according to claim 1, wherein range types of the element [IUn, IUc] comprise at least one of enumeration, range, mutex, and no dependency relationship.

3. The method according to claim 2, further comprising applying at least one of the following operations to the specified IU:

installing a new IU, wherein the new IU does not exist in the version dependency relationship between the installed IUs prior to the updating;

installing another version of an old IU, wherein a version of the old IU, other than the another version, exists in the version dependency relationship prior to the updating; and uninstalling an installed IU, wherein the installed IU already exists in the version dependency relationship between the installed IUs prior to the updating.

4. The method according to claim 3, wherein in response to installing the new IU, the updating the version dependency relationship between the installed IUs according to the version dependency relationship between the IUs that are in the dependency relationship with the specified IU comprises:

adding the new IU respectively into the first row and first column of the version dependency matrix between the installed IUs; and adding a dependency relationship value described by the version dependency matrix between IUs that are in the dependency relationship with the new IU, into a corresponding element of the version dependency matrix between the installed IUs.

5. The method according to claim 3, further comprising:

in response to having checked that the specified IU has no version conflict with the updated version dependency relationship between the installed IUs, storing the version dependency relationship between the installed IUs after each update and an updating sequence;

wherein in response to installing the another version of the old IU, the updating the version dependency relationship between the installed IUs according to the version dependency relationship between the IUs that are in a dependency relationship with the specified IU comprises:

obtaining, from the stored version dependency relationship between the installed IUs, the version dependency relationship between the installed IUs that contains the old IU and that has the latest updating sequence, as the version dependency matrix between IUs that are in the dependency relationship with the old IU.

6. The method according to claim 3, wherein while installing the another version of the old IU, the updating the version dependency relationship between the installed IUs according to the version dependency relationship between the IUs that are in the dependency relationship with the specified IU comprises:

updating the diagonal element, to which the old IU corresponds, in the version dependency matrix between the installed IUs as an installation status of the another version of the old IU; and updating the dependency relationship value described by the version dependency matrix between the IUs that are in a dependency relationship with the old IU, to a corresponding element in the version dependency matrix between the installed IUs.

7. The method according to claim 3, wherein while uninstalling the old IU, the updating the version dependency relationship between the installed IUs according to the version dependency relationship between the IUs that are in a dependency relationship with the specified IU comprises: updating a diagonal element, to which the old IU corresponds, in the version dependency matrix between the installed IUs as an installation status of not installed.

8. The method according to claim 3, wherein the checking whether or the specified IU has the version conflict with the updated version dependency relationship between the installed IUs comprises:

checking a dependency relationship value related to the specified IU in the updated version dependency matrix between the installed IUs; and evaluating whether an operation on the specified IU is proper based on a result of checking the dependency relationship value.

9. The method according to claim 8, wherein the dependency relationship value is checked using the following rules:

if a range type of [IUn, IUc] is no dependency, the checking result for [IUn, IUc] is no version conflict;

if a range type of [IUn, IUc] is mutex, it is checked whether the range type of [IUc, IUn] is mutex, and it is checked that the range type of at least one of [IUc, IUc] and [IUn, IUn] is not installed;

if both are established, the checking result for [IUn, IUc] is no version conflict;

or else a version conflict; and if a range type of [IUn, IUc] is enumeration or range, it is checked whether a value of [IUc, IUc] is within a range of each value of [IUn, IUc];

if yes, a checking result for [IUn, IUc] is no version conflict;

or else a version conflict.

10. A system configured for version conflict checking of an installable unit (IU), the system comprising:

a memory having computer readable instructions; and a processor for executing the computer readable instructions, the instructions including:

a receiving module configured to receive a request for the version conflict checking of a specified IU, the request comprising a version dependency relationship between IUs that are in a dependency relationship with the specified IU;

an obtaining module configured to obtain the version dependency relationship between installed IUs, the version dependency relationship represented using a version dependency matrix, wherein:

each of a first row and a first column of the version dependency matrix represents a group of sequential IUs, and IUs in the first row are arranged in the same order as IUs in the first column;

except for elements in the first row and first column, a diagonal element of the version dependency matrix represents an installation status of an IU in this row or column; and an element [IUn, IUc] in row n and column c of the version dependency matrix represents a dependency relationship value of an IU in the nth row and the 1st column on an IU in the 1st row and the cth column, wherein each of n and c is an integer greater than 1 and n is not equal to c;

an updating module configured to update the version dependency relationship between the installed IUs according to the version dependency relationship between the IUs that are in the dependency relationship with the specified IU; and a checking module configured to check whether the specified IU has a version conflict with the updated version dependency relationship between the installed IUs.

11. The system according to claim 10, wherein range types of the element [IUn, IUc] comprise at least one of enumeration, range, mutex and no dependency relationship.

12. The system according to claim 11, wherein the system applies at least one of the following operations to the specified IU:

installing a new IU, wherein the new IU does not exist in the version dependency relationship between the installed IUs that has not been updated;

installing another version of an old IU, wherein a version of the old IU, other than the another version, exists in the version dependency relationship between the installed IUs that has not been updated; and uninstalling an installed IU, wherein the installed IU already exists in the version dependency relationship between the installed IUs that has not been updated.

13. The system according to claim 12, wherein in response to installing the new IU, operations performed by the updating module comprise:

adding the new IU respectively into the first row and first column of the version dependency matrix between the installed IUs;

adding an installation status of the new IU into a diagonal element, to which the new IU corresponds, of the version dependency matrix between the installed IUs; and adding a dependency relationship value described by the version dependency matrix between IUs that are in the dependency relationship with the new IU, into a corresponding element of the version dependency matrix between the installed IUs.

14. The system according to claim 12, further comprising:

a storage module configured to store, in response to having checked that the specified IU has no version conflict with the updated version dependency relationship between the installed IUs, the version dependency relationship between the installed IUs after each update and an updating sequence;

wherein in response to installing the another version of the old IU, operations performed by the updating module further comprise:

obtaining, from the stored version dependency relationship between the installed IUs, the version dependency relationship between the installed IUs that contains the old IU and that has the latest updating sequence, as the version dependency matrix between IUs that are in the dependency relationship with the old IU.

15. The system according to claim 12, wherein while installing the another version of the old IU, operations performed by the updating module comprise:

updating the diagonal element, to which the old IU corresponds, in the version dependency matrix between the installed IUs as an installation status of the another version of the old IU; and updating the dependency relationship value described by the version dependency matrix between the IUs that are in the dependency relationship with the old IU, to a corresponding element in the version dependency matrix between the installed IUs.

16. The system according to claim 12, wherein while uninstalling the old IU, operations performed by the updating module comprise:

updating the diagonal element, to which the old IU corresponds, in the version dependency matrix between the installed IUs as an installation status of not installed.

17. The system according to claim 12, wherein operations performed by the checking module comprise:

checking a dependency relationship value related to the specified IU in the updated version dependency matrix between the installed IUs; and evaluating whether an operation on the at least one IU is proper or not, according to a result of checking the dependency relationship value.

18. A computer program product for version conflict checking of installable units (IUs), the computer program product comprising:

a non-transitory computer readable storage medium having program code embodied therewith, the program code executable by a processor for:

receiving, by a processor, a request for the version conflict checking of a specified IU, the request comprising a version dependency relationship between IUs that are in a dependency relationship with the specified IU;

obtaining a version dependency relationship between installed IUs, the version dependency relationship represented using a version dependency matrix, wherein:

each of a first row and a first column of the version dependency matrix represents a group of sequential IUs, and IUs in the first row are arranged in the same order as IUs in the first column;

except for elements in the first row and first column, a diagonal element of the version dependency matrix represents an installation status of an IU in this row or column; and an element [IUn, IUc] in row n and column c of the version dependency matrix represents a dependency relationship value of an IU in the nth row and the 1st column on an IU in the 1st row and the cth column, wherein each of n and c is an integer greater than 1 and n is not equal to c;

updating the version dependency relationship between the installed IUs based on the version dependency relationship between the IUs that are in the dependency relationship with the specified IU; and checking whether the specified IU has a version conflict with the updated version dependency relationship between the installed IUs.

* * * * *